United States Patent
Lee

(10) Patent No.: US 6,173,234 B1
(45) Date of Patent: Jan. 9, 2001

(54) AXIAL BEARING FLY-HEIGHT MEASUREMENT TO DETECT OIL DEFICIENCY

(75) Inventor: Chen-Hsiung Lee, San Jose, CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/129,976

(22) Filed: Aug. 5, 1998

(51) Int. Cl.[7] .................................................. G01F 23/20
(52) U.S. Cl. ................................................ 702/50; 310/90.5
(58) Field of Search ............................... 311/11; 29/888; 417/18, 32, 20, 45, 53; 73/516, 660; 384/100; 141/51; 360/137; 310/90.5; 702/50

(56) References Cited

U.S. PATENT DOCUMENTS

| | | | |
|---|---|---|---|
| 3,173,299 | * | 3/1965 | Peterson .................................. 73/516 |
| 4,464,935 | * | 8/1984 | McHugh .................................. 73/600 |
| 4,652,149 | * | 3/1987 | Nakaoka et al. ....................... 384/100 |
| 5,036,235 | * | 7/1991 | Kleckner .............................. 310/90.5 |
| 5,066,197 | * | 11/1991 | Champagne ........................... 417/18 |
| 5,067,528 | * | 11/1991 | Titcomb et al. .......................... 141/4 |
| 5,575,355 | * | 11/1996 | Williams et al. .................... 184/55.1 |
| 5,601,125 | * | 2/1997 | Parsoneault et al. .................. 141/51 |
| 5,612,845 | * | 3/1997 | Smith .................................... 360/137 |

FOREIGN PATENT DOCUMENTS

| | | | |
|---|---|---|---|
| 62-132282 | * | 6/1987 | (JP) ............................... G11B/21/21 |
| 7-218389 | * | 8/1995 | (JP) ............................... G01M/13/04 |

* cited by examiner

Primary Examiner—Patrick Assouad
Assistant Examiner—Edward Raymond
(74) Attorney, Agent, or Firm—Robert O. Guillot; Oppenheimer Wolff & Donnelly LLP

(57) ABSTRACT

The method for determining the sufficiency of fluid in a hydrodynamic fluid bearing motor involves making a first determination of a range of fluid bearing fly-heights for motors having a sufficient quantity of fluid within the hydrodynamic fluid bearing, and for motors having an insufficient quantity of fluid within the hydrodynamic fluid bearing. Thereafter, the fly-height of a particular hydrodynamic fluid bearing motors can be determined and compared with the range of hydrodynamic fluid bearing fly-heights to provide a determination of the sufficiency of fluid within the particular hydrodynamic fluid bearing motor. Determining the fly-height of a particular hydrodynamic fluid bearing motor involves the utilization of non-contact displacement probes that generate a first signal indicative of the displacement of a rotating component of the bearing at a time when the component is rotating at a maximum fly-height. The probes then generate a second signal indicative of the displacement of the rotating component at a time when said component has ceased its flying within the hydrodynamic bearing. The difference between the first and second signals is an indication of the fly-height of said hydrodynamic fluid bearing of said particular motor.

21 Claims, 2 Drawing Sheets

AXIAL BEARING FLY-HEIGHT MEASUREMENT TO DETECT OIL DEFICIENCY

BACKGROUND OF THE INVENTION

1. Field of the Invention

The present invention relates generally to hydrodynamic fluid bearings for motors such as are utilized in hard disk drives, and more particularly to methods for determining whether sufficient oil resides within the bearing following assembly thereof.

2. Description of the Prior Art

Hydrodynamic fluid bearing motors are utilized in applications that require high speed reliable performance, such as in hard disk drives. Such motors have close tolerances and require the insertion of an adequate quantity of fluid into the hydrodynamic fluid bearing during manufacturing. If insufficient fluid is inserted into the bearing during the manufacturing process, the operational lifetime of the motor can be shortened significantly. However, because such motors are sealed following the fluid insertion step, there has been no way to determine, following sealing of the motor, whether sufficient oil was inserted therewithin. Therefore, while an important step in the quality control evaluation of such motors should involve a determination of whether sufficient fluid has been inserted into the hydrodynamic fluid bearing during the manufacturing thereof, there has been no method to make this determination.

The present invention provides a solution to this problem in a recognition that the fly-height of the hydrodynamic fluid bearing is affected by the quantity of fluid within the bearing, and in the development of a device and method for determining the fly-height of the hydrodynamic fluid bearing. As a result, the present invention provides a device and method for determining the fly-height of the bearing as a measure of the sufficiency of oil therewithin, and thus a measure of the quality of the motor.

SUMMARY OF THE INVENTION

The method for determining the sufficiency of fluid in a hydrodynamic fluid bearing motor involves making a first determination of a range of fluid bearing fly-heights for motors having a sufficient quantity of fluid within the hydrodynamic fluid bearing, and for motors having an insufficient quantity of fluid within the hydrodynamic fluid bearing. Thereafter, the fly-height of a particular hydrodynamic fluid bearing motors can be determined and compared with the range of hydrodynamic fluid bearing fly-heights to provide a determination of the sufficiency of fluid within the particular hydrodynamic fluid bearing motor. Determining the fly-height of a particular hydrodynamic fluid bearing motor involves the utilization of non-contact displacement probes that generate a first signal indicative of the displacement of a rotating component of the bearing at a time when the component is rotating at a maximum fly-height. The probes then generate a second signal indicative of the displacement of the rotating component at a time when said component has ceased its flying within the hydrodynamic bearing. The difference between the first and second signals is an indication of the fly-height of said hydrodynamic fluid bearing of said particular motor.

It is an advantage of the present invention that a method for determining the quality of hydrodynamic fluid bearing motors is provided.

It is another advantage of the present invention that the sufficiency of fluid within a hydrodynamic fluid bearing can be determined.

It is a further advantage of the present invention that the fly-height of components of a hydrodynamic fluid bearing can be determined.

It is yet another advantage of the present invention that improved hydrodynamic fluid bearing motors are produced.

It is yet a further advantage of the present invention that improved hard disk drive motors are produced.

These and other features and advantages of the present invention will become apparent to those skilled in the art upon reading the following detailed description of the invention which makes reference to the several figures of the drawings.

IN THE DRAWINGS

DETAILED DESCRIPTION OF THE PREFERRED EMBODIMENTS

Hydrodynamic fluid bearing motors have been manufactured for many years. Such motors may be divided into two general categories, stationary shaft motors and rotating shaft motors. In both types of motors, the manufacturing tolerances of the hydrodynamic fluid bearing components are very strict, such that the proper flying characteristics of the rotating components can be obtained, and such tolerances generally involve gaps between rotating and fixed components on the order of 3–10 microns. Even where the bearing components have been properly manufactured within the appropriate tolerances, a further factor in the proper operation of such motors is the insertion of a proper amount of fluid into the appropriate bearing gaps. Typically, various motor components are assembled, the hydrodynamic fluid is inserted into the motor and the motor is thereafter sealed. Significantly, the motor must be sealed before it can be tested, and additional hydrodynamic fluid cannot be added to the motor after it has been sealed. Where insufficient fluid has been inserted into the motor during assembly, the motor generally fails early in its life cycle. However, there has heretofore been no means to determine whether sufficient oil has been inserted into the motor during manufacturing, and therefore no way to determine if the sealed motors are defective due to fluid deficiency.

The present inventor has discovered that a relationship exists between oil deficiency and the hydrodynamic fluid bearing fly-height. That is, that hydrodynamic fluid bearings having a proper fluid insertion will fly within a predetermined fly-height range, whereas motors manufactured with an insufficient fluid insertion will fly at a lower fly-height. In conjunction with this discovery, a system for measuring the fly-height of the hydrodynamic bearing has also been developed. Therefore, with the utilization of the hydrodynamic bearing fly-height measurement system of the present invention, and a predetermined knowledge of the fly-height range of a properly manufactured motors and the fly-height range of improperly manufactured, fluid deficient motors, the present invention can be utilized to test a sealed motor to determine whether sufficient fluid has been inserted into the hydrodynamic fluid bearing of the motor. Quality control testing of the hydrodynamic fluid bearing is therefore achievable. A detailed description of the invention is next presented.

Figure 1:
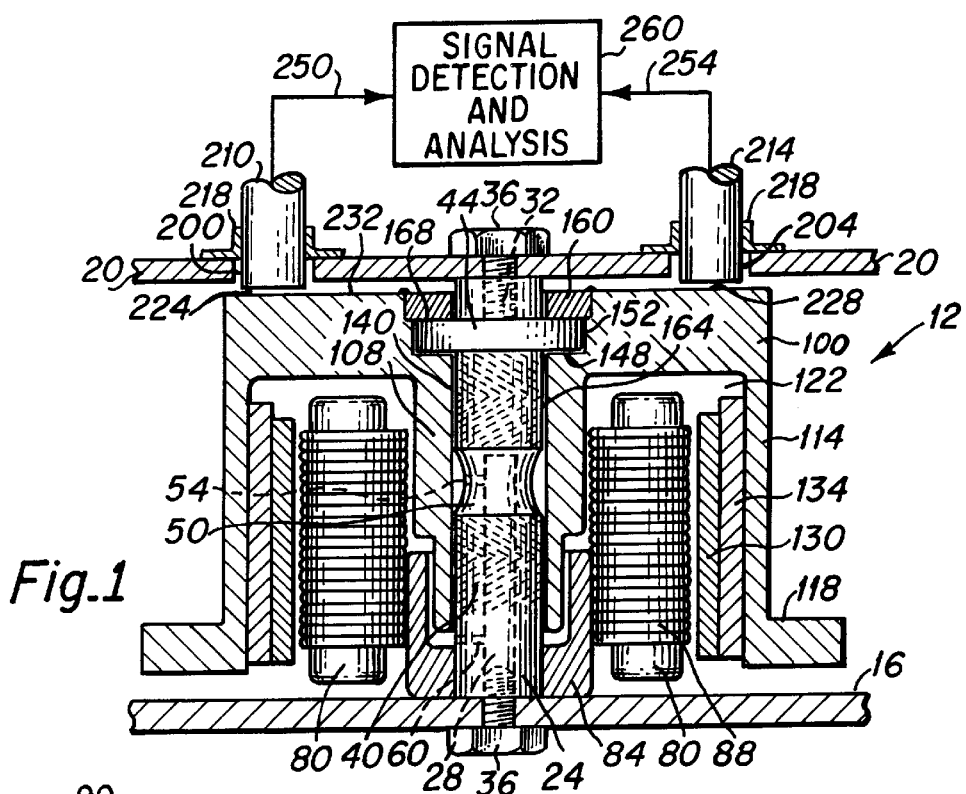
FIG. 1 is a cross-sectional view of a hydrodynamic fluid bearing motor showing an embodiment of the present invention.

FIG. 1 includes a cross-sectional depiction of a standard, prior art hydrodynamic bearing motor 12 disposed between a lower plate 16 and an upper plate 20 of a device housing, such as a hard disk drive housing, wherein the motor 12 is utilized to rotate a plurality of hard disks (not shown) that are mounted thereon. To aid in the comprehension of the motor components, those components which remain stationary are drawn as solid pieces, whereas those components which rotate are shown in cross-section, with the exception that the housing plates 16 and 20 are shown in cross-section, though they do not rotate.

As depicted in FIG. 1, the motor 12 includes a stationary shaft 24 having threaded, axially disposed engagement bores 28 and 32 formed therein. Threaded engagement screws 36 are utilized to engage the stationary motor shaft 24 to the lower 16 and upper 20 housing plates. As is well known to those skilled in the art, a plurality of "V" shaped chevrons 40 are formed in the surface of the shaft 24 to provide fluid control during rotation of the hydrodynamic bearing. A thrust plate 44 is fixedly engaged to the shaft 24 to provide horizontal bearing surfaces for the hydrodynamic bearing characteristic of the motor 12, and chevrons (not shown) are similarly formed on the upper and lower bearing surfaces of the thrust plate 44 to also provide fluid control during rotation of the hydrodynamic bearing. A central portion 50 of the shaft 24 is recessed to form a dynamic fluid seal by taking advantage of the surface tension and capillary action of the fluid within the bearing, as is also well known to those skilled in the art. An air pressure equalizing bore 54 which communicates through the axial bore 28 to a second air pressure equalizing bore 60 is also provided in the shaft 24, as is known to those skilled in the art. A stator 88 is fixedly engaged to a stator mounting member 84 that is engaged to the stationary shaft 24. Electrical coil windings 80 are wound around the stator to provide the electrical field that drives the motor.

The movable components of the motor include a generally cylindrical hub 100 including a centrally disposed sleeve portion 108 and an outwardly disposed wall portion 114 having a flared outer edge 118. An annular space 122 is formed within the hub 100, between the sleeve portion 108 and the outer wall portion 114, to surround the stator 88. A magnet 130 is engaged to a backiron member 134 which is engaged to the inner surface of the outer wall 114 of the hub 100. An axial bore 140 is formed through the sleeve portion 108 of the hub 100, and a shoulder 148 with an enlarged diameter bore section 152 rotatably engages the thrust plate 44. A cover plate 160 is fixedly engaged to the hub 100 on the outboard side of the thrust plate 44.

As is known to those skilled in the art, the manufacturing tolerances for hydrodynamic bearings are precise. Typically, the gap 164 between the shaft 24 and the sleeve bore 140 is on the order of 2–5 microns, and the gap 168 surrounding the thrust plate bearing surfaces is somewhat larger. When the motor 12 is manufactured, a bearing fluid, such as an oil, is inserted into the motor to occupy the sleeve gap 164 and the thrust plate gap 168 to the appropriate degree. Thereafter, the cover plate 160 is fixedly engaged to the hub 100. After the cover plate 160 has been engaged to the hub 100, the hydrodynamic bearing surfaces of the motor are effectively sealed and further oil cannot be added into the hydrodynamic bearing if the oil previously inserted is insufficient. Where the oil is insufficient, the motor 12 will not perform properly, or will fail early in its life cycle. Heretofore it has not been possible to determine after the motor is sealed, whether sufficient oil resides therewithin. The present invention provides a solution to this problem, as is next discussed.

Through experimentation, it has been discovered that a motor having insufficient oil will have a low flying height during operation. Thus, the present invention provides a method for determining the axial bearing flying height as an indicator of oil deficiency. As depicted in FIG. 1, in the present invention the upper housing plate 20 is formed with two access holes 200 and 204 and a non-contact displacement measurement probe 210 and 214 is placed within the holes 200 and 204 respectively. The probes 210 and 214 are held in place with a sleeve member 218 although other attachment means can be utilized. It is important to note that the two probes 210 and 214 and placed at the same radial distance from the center line of the shaft 24, and that they are placed 180° apart. The probes 210 and 214 are provided to measure the gaps 224 and 228 between the probe ends and the upper surface 232 of the rotating hub 100. Suitable devices which will function adequately as the probes 210 and 214 include any non-contact distance measurement device, such as a capacitance probe, eddy current probe and photo-optical probe. In the preferred embodiment a capacitance probe is utilized.

It is therefore to be understood that the gaps 224 and 228 will change as the motor 12 operates and the hub 100 rotates. Specifically, when the motor 12 is disposed as depicted in FIG. 1, which will arbitrarily be termed the "right-side-up" configuration herein, the gaps 224 and 228 will be at their largest value when the motor is stationary. Thereafter, when the motor 12 is operating a full speed, the cover plate 160 and rotating hub 100 will lift off of the surface of the thrust plate 44 to achieve the operational fly-height of the motor 12. When this occurs, the gaps 224 and 228 will become smaller and the difference ($\Delta$) in the distance measurement from the probes will represent the fly-height of the motor. Where the fly-height of the motor is significantly less than the pre-assembly design parameter, it is known that a motor assembly problem exists, that problem typically being that insufficient oil has been injected into the motor bearing surfaces during assembly. It is then known that the assembled motor is defective.

Figure 2:
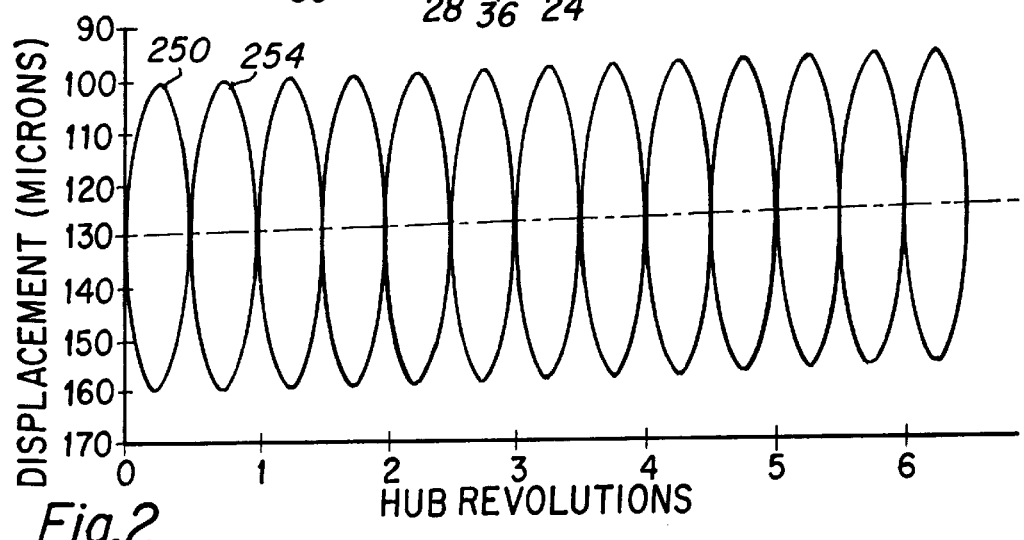
FIG. 2 is a graph depicting the two displacement probe signals.

FIG. 2 is a graph that depicts analog signals received by the signal detection and analysis computer circuitry 260 from the probes 210 and 214, wherein signal 250 is received from probe 210 and signal 254 is received from probe 214. The signals are taken at a time when the motor 12 is rotating at operational speed (approximately 10,000 rpm). Each signal is a sine wave, which reflects the fact that, within tolerances, the hub upper surface 232, although substantially flat, is typically assembled somewhat off from true normal to the stationary shaft 24. The sine wave nature of the signals 250 and 254 can also result from a mounting of the thrust plate 44 upon the shaft 24 that is not truly perpendicular. Given the manufacturing tolerances of the assembled motor, it is typically the case that the peak to trough gap measurement experienced during one rotation may be on the order of 60 microns. This differential measurement, termed the Total Indicator Runout (TIR), is a significant measurement in that it is practically an order of magnitude larger than the axial fly-height value, typically 4–9 microns, that is to be measured. Thus, if a single probe, such as probe 210, is utilized in attempting to measure the axial fly-height of a stationary shaft motor 12, the TIR is generally so large as to mask the axial fly-height displacement measurement. To solve this problem, two probes 210 and 214 are utilized to provide measurements for the rotating hub motor 12; and as indicated above, the probes 210 and 214 are disposed 180° apart at an equal radial distance from the stationary shaft 24.

In the preferred embodiment, the signal 250 from probe 210 is added to the signal 254 from probe 214. Due to the location of the probes 210 and 214 (180° apart), the two signals 250 and 254 are 180° out of phase. Therefore, upon adding the signals, the TIR of one signal cancels the TIR of the other signal, and the resulting added signal 256 is depicted in FIG. 3.

Figure 3:
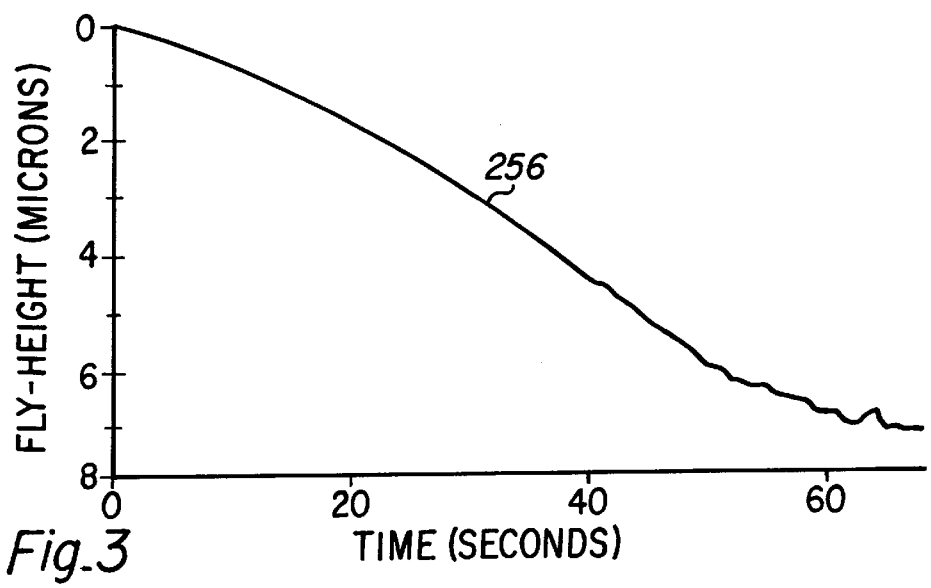
FIG. 3 is a graphical depiction of the addition of the two probe signals during spin down.

As depicted in FIG. 3, at time zero (the horizontal graph axis represents time) the motor 12 is rotating at 10,000 rpm at its maximum axial fly-height (the vertical axis represents fly-height). The power to the motor is turned off at time zero and the rotation of the hub 100 slows down. As the hub slows down the axial fly-height decreases, until at time of approximately 67 seconds the motor has stopped spinning and the axial fly-height measurement is approximately 7 microns. It is to be noted that in FIG. 3 the rotating axial fly-height at time zero is arbitrarily assigned a value zero. In reality the gap has a positive initial value which increases as the motor slows down. The initial value may be mathematically omitted because the starting gap value is subtracted from the ending gap signal value, which yields the fly-height, that is 7 microns. The signal processing of the invention is next discussed.

Figure 4:
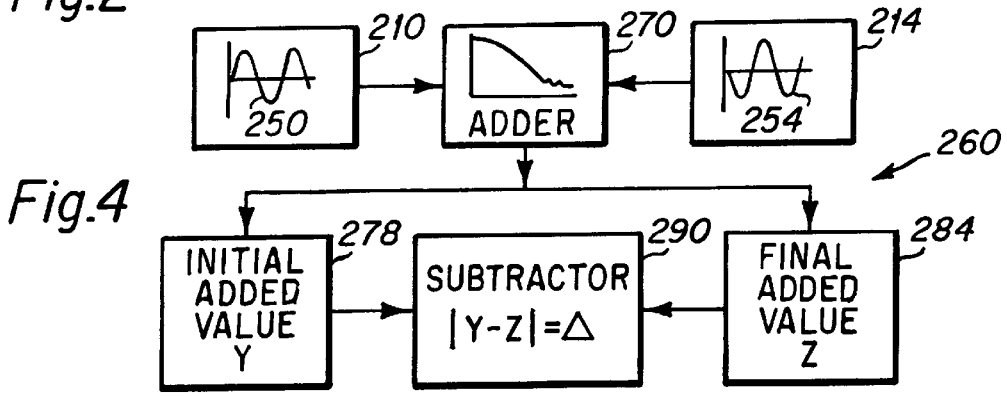
FIG. 4 is a schematic diagram of the signal processing logic of the present invention.

FIG. 4 is a signal processing schematic for the device depicted in FIG. 1. As depicted in FIG. 4, signals 250 from probe 210 and signals 254 from probe 214 are fed to a signal adder 270. These signals are the 180° out of phase sine wave signals of FIG. 2, and their addition yields the values shown in FIG. 3. The initial added signal value (Y) 278 (for operational fly-height) is stored in a suitable memory storage device location. Thereafter, when the motor has stopped flying, the final adder value (Z) 284 is also stored in a suitable memory storage device location. Thereafter, the initial adder value and the final adder value are fed to a subtractor 290. The absolute value of the subtractor output |Y-Z| is the axial bearing fly-height Δ.

Figure 5:
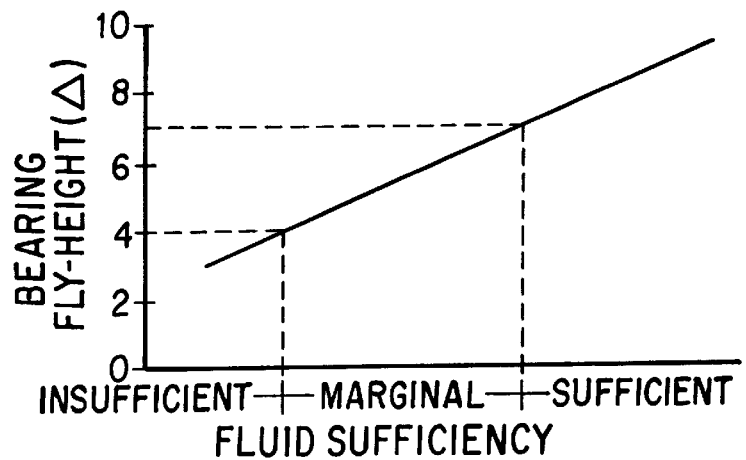
FIG. 5 is a graphical depiction of the relationship between the hydrodynamic fluid bearing fly-height (Δ) and the sufficiency of fluid within the hydrodynamic fluid bearing.

The device and method described hereabove is therefore utilizable to develop a systematic relationship between the hydrodynamic fluid bearing fly-height and the sufficiency of oil therewithin. That is, utilizing the hydrodynamic fluid bearing fly-height measurement device and method described hereabove, on a plurality of manufactured motors, a graphical depiction such as is presented in FIG. 5 may be developed for a particular type of manufactured motors. As depicted in FIG. 5, the vertical axis represents the hydrodynamic bearing fly-height Δ for a particular type of motor and the horizontal axis represents the sufficiency of fluid within the bearing. For the particular type of motor, it is seen that a fly-height Δ less than 4 microns indicates insufficient fluid, a fly-height Δ greater than 7 microns indicates sufficient fluid, and a fly-height between 4 microns and 7 microns indicates a marginal performance motor. Thus, for a typical disk drive motor described herein, an axial bearing fly-height Δ of 7–9 microns is considered to be indicative of a properly manufactured motor having sufficient oil for lifetime operation, whereas a Δ of less than 4 microns indicates a poorly manufactured motor having insufficient oil, which constitutes a rejectable part. Motors with fly-heights between 4 and 7 microns are questionable.

It is desirable to test motors in both the right-side-up orientation depicted in FIG. 1, and the upside-down orientation which is depicted herein by turning FIG. 1 180° degrees. In the upside-down orientation the bottom side of the thrust plate becomes the oil bearing surface, however the measurements taken by the probes 210 and 214 and the signal processing of the probe signals 250 and 254 respectively, remains the same. That is, as depicted in FIG. 4, with the motor in the upside-down configuration the signals 250 and 254 are added commencing with the motor at full speed and ending with the motor stopped. The initial adder value signal (Y) 278 and the final adder value signal (Z) 284 are fed to the subtractor 290, and the absolute value |Y-Z| of the subtracted signal represents the axial bearing fly-height Δ. While it might seem that the right-side-up Δ and the upside-down Δ should be equal, such is rarely the case. For a motor to be acceptable the axial bearing fly-height when the motor is right-side-up and when the motor is upside-down should both be within the acceptable range of 7–10 microns.

Figure 6:
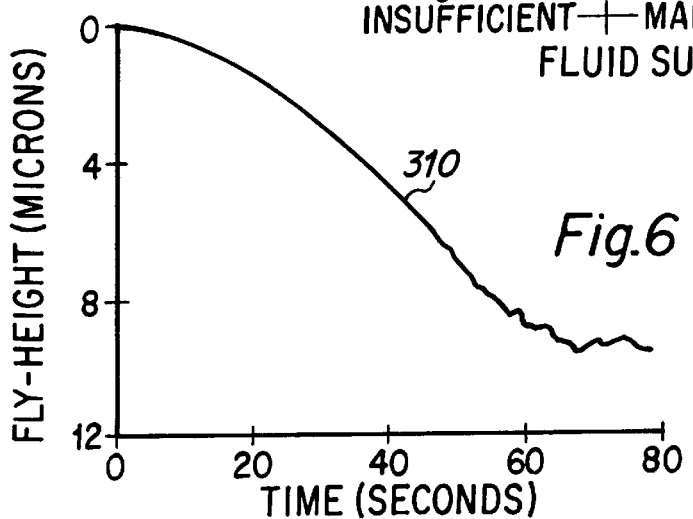
FIG. 6 is a graphical depiction of the single probe signal for a rotating shaft hydrodynamic bearing motor.
Figure 7:
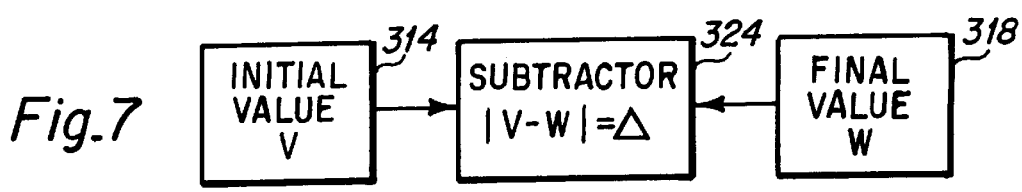
FIG. 7 is a schematic diagram of the signal processing logic of the signal depicted in FIG. 6.

The present invention is also applicable to the rotating shaft type of hydrodynamic bearing motor, wherein the hub is fixed. As is known to those skilled in the art, in such motors, the rotatable shaft includes a hydrodynamic bearing which causes it to fly at a predetermined fly-height when rotating. For such a motor, a single non-contact displacement probe is positioned at the central axis of the rotating shaft to measure its fly-height. FIG. 6 is a graph depicting the signal 310 generated by such a single probe. Initially, it is noted that the probe signal 310 is not a sine wave, as were the signals 250 and 254 from the embodiment depicted in FIG. 1, because the probe is located at the center of rotation of the shaft, and does not experience the TIR of the radially disposed probes 210 and 214. The signal processing for the single probe signal 310 is presented in the schematic of FIG. 7. No adder is required, as was necessary with the two probes of the first embodiment. Rather, the initial signal (V) 314 at full speed rotation is stored in a memory location and the final signal (W) 318 at zero rpm is also stored in a memory location. Thereafter, the signals are fed to a subtractor 324 and the absolute value |V-W| of the subtractor output represents the axial fly-height Δ. As with the prior embodiment, an acceptable value for Δ indicates that sufficient oil has been injected into the motor, whereas a low value for Δ indicates insufficient oil, and thus a rejected component. Of course, as indicated previously with regard to signal processing for the motor 12, the axial fly-height of the motor should be measured in the right-side-up and upside-down orientations to fully evaluate the motor.

While the present invention has been described with reference to certain preferred embodiments, it is to be understood that alterations and modifications of the present invention will become known to those skilled in the art upon reviewing the preceding detailed description of the invention. It is therefore intended by the inventor that the following claims cover all such alterations and modifications that include the true spirit and scope of the invention.

What I claim is:

1. A method for determining the sufficiency of fluid in a hydrodynamic fluid bearing motor comprising the steps of:

determining a range of fluid bearing fly-heights for motors having a sufficient quantity of fluid within the hydrodynamic fluid bearing thereof and for motors having an insufficient quantity of fluid within the hydrodynamic fluid bearing thereof;

determining the fly-height of a particular hydrodynamic fluid bearing motor;

comparing said particular motor fly-height with said range of fluid bearing fly-heights to provide a determination of the sufficiency of fluid within said particular hydrodynamic fluid bearing motor.

2. A method as described in claim 1 wherein said step of determining the fly-height of a particular hydrodynamic fluid bearing motor includes the steps of:

generating a first signal indicative of the displacement of a rotating component of said motor at a time when said component is rotating at a maximum fly-height;

generating a second signal indicative of the displacement of said rotating component at a time when said component has ceased its flying within its hydrodynamic bearing;

determining the difference between said first and second signals as an indication of the fly-height of said hydrodynamic fluid bearing of said particular motor.

3. A method as described in claim 2 wherein said hydrodynamic fluid bearing includes a stationary shaft portion and a rotating hub portion.

4. A method as described in claim 3 wherein two displacement probes are utilized to obtain said first signal and said two displacement probes are utilized to obtain said second signal.

5. A method as described in claim 4 wherein a first said displacement probe generates a first probe signal and a second said displacement probe generates a second probe signal, and wherein said first probe signal is 180° out of phase with said second probe signal.

6. A method as described in claim 5 wherein a signal from said first probe and a signal from said second probe are added together to generate said first signal.

7. A method as described in claim 6 wherein a signal from said first probe and a signal from said second probe are added together to generate said second signal.

8. A method as described in claim 2 wherein said hydrodynamic fluid bearing includes a rotating shaft portion and a stationary hub portion.

9. A method as described in claim 1 wherein said steps are conducted with said motor in a right-side-up orientation, and said steps are conducted with said motor in an upside-down orientation.

10. A method for determining the fly-height of a hydrodynamic fluid bearing comprising the steps of:

generating a first signal indicative of the displacement of a rotating component of said motor at a time when said component is rotating at a maximum fly-height;

generating a second signal indicative of the displacement of said rotating component at a time when said component has ceased its flying within its hydrodynamic bearing;

determining the difference between said first and second signals as an indication of the fly-height of said hydrodynamic fluid bearing of said particular motor.

11. A method as described in claim 10 wherein said hydrodynamic fluid bearing includes a stationary shaft portion and a rotating hub portion.

12. A method as described in claim 11 wherein two displacement probes are utilized to obtain said first signal and said two displacement probes are utilized to obtain said second signal.

13. A method as described in claim 12 wherein a first said displacement probe generates a first probe signal and a second said displacement probe generates a second probe signal, and wherein said first probe signal is 180° out of phase with said second probe signal.

14. A method as described in claim 13 wherein a signal from said first probe and a signal from said second probe are added together to generate said first signal.

15. A method as described in claim 14 wherein a signal from said first probe and a signal from said second probe are added together to generate said second signal.

16. A hydrodynamic fluid bearing fly-height measuring device comprising:

at least one non-contact displacement probe, said probe being disposed in a fixed relationship relative to a component of said hydrodynamic fluid bearing that achieves a fly-height upon rotation thereof; said probe outputting a displacement signal related to the distance between said probe and said component;

a signal processor being operationally engaged to said probe to receive and store a first displacement signal from said probe when said component is at a maximum fly-height, and to receive and store a second displacement signal from said probe when said component is disposed at a minimum fly-height;

said signal processor determining the difference between said stored signals and providing an output signal as a measure of said fly-height of said hydrodynamic fluid bearing.

17. A device as described in claim 16 wherein said probe is a capacitance probe.

18. A device as described in claim 16 wherein said probe is a eddy current probe.

19. A device as described in claim 16 wherein said probe is a photo-optical probe.

20. A device as described in claim 16 wherein said hydrodynamic fluid bearing is formed between a stationary shaft member and a rotating hub member, and wherein two said probes are disposed at a 180° angle apart relative to said rotating hub member and said shaft member, and said two probes are disposed at an equal radial distance from said shaft member.

21. A device as described in claim 20 wherein displacement signals from said two probes are added together to determine said first displacement signal, and wherein displacement signals from said two probes are added together to determine said second displacement signal.

* * * * *